(12) United States Patent
Lei et al.

(10) Patent No.: US 10,334,394 B2
(45) Date of Patent: Jun. 25, 2019

(54) METHOD AND APPARATUS FOR GEO-FENCING USING WIRELESS POINT SOURCES

(71) Applicant: FORD GLOBAL TECHNOLOGIES, LLC, Dearborn, MI (US)

(72) Inventors: Oliver Lei, Windsor (CA); Allen R. Murray, Lake Orion, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 234 days.

(21) Appl. No.: 15/047,709

(22) Filed: Feb. 19, 2016

(65) Prior Publication Data
US 2017/0245107 A1    Aug. 24, 2017

(51) Int. Cl.
| H04W 24/00 | (2009.01) |
| H04W 4/021 | (2018.01) |
| H04W 4/80  | (2018.01) |
| H04W 4/04  | (2009.01) |
| H04W 4/12  | (2009.01) |

(52) U.S. Cl.
CPC .......... *H04W 4/021* (2013.01); *H04W 4/046* (2013.01); *H04W 4/12* (2013.01); *H04W 4/80* (2018.02)

(58) Field of Classification Search
CPC ......... H04W 4/00; H04W 4/008; H04W 4/02; H04W 4/021; H04W 4/022; H04W 4/023; H04W 4/027; H04W 4/046

USPC ................... 455/456.1, 456.2, 456.3
See application file for complete search history.

(56) References Cited

U.S. PATENT DOCUMENTS

| 8,933,776 B2 | 1/2015 | Dua et al. | |
| 2013/0325940 A1 | 12/2013 | Foti | |
| 2014/0354451 A1 | 12/2014 | Tonguz et al. | |
| 2015/0095156 A1* | 4/2015 | Sauerbrey | H04L 67/303 |
| | | | 705/14.58 |
| 2016/0203651 A1* | 7/2016 | Heath | G06Q 50/30 |
| | | | 705/13 |
| 2016/0210670 A9* | 7/2016 | Bennett | H04W 4/046 |

OTHER PUBLICATIONS

US Department of Transportation, Service Awareness, Southeast Michigan Test Bed Resource Guide, Oct. 9, 2015, p. 4, USA.
Schlesinger, Dirk DR. and Girardot, Marc, Connect to the Cloud, Smart and Connected Passenger Vehicle, Cisco, Oct. 9, 2015, p. 3.
Gilles, Tim, Telematics, Automotive Service: Inspection, Maintenance, Repair, Oct. 9, 2015, p. 791.

* cited by examiner

*Primary Examiner* — Temica M Beamer
(74) *Attorney, Agent, or Firm* — Frank Lollo; Brooks Kushman PC

(57) ABSTRACT

An illustrative system includes a processor configured to receive a boundary defining a geo-fence and a vehicle identifier. The processor is also configured to associate a plurality of existing dedicated short range communication (DSRC) transceivers with the boundary and send the vehicle identifier to each of the associated DSRC transceivers.

13 Claims, 3 Drawing Sheets

METHOD AND APPARATUS FOR GEO-FENCING USING WIRELESS POINT SOURCES

TECHNICAL FIELD

The illustrative embodiments generally relate to a method and apparatus for geo-fencing using wireless point sources.

BACKGROUND

Geo-fencing is a concept that has risen in popularity with the mass availability of GPS-detecting devices. Typically, a geo-fence will consist of a defined set of geographic points, designated in GPS coordinates. Boundaries between these coordinates form a "fence," and the fence is often used to detect if a person or object has crossed the fence. For example, a person carrying a wireless device with GPS detection capability can be notified if a defined geo-fence is crossed, or a driver, fleet manager, vehicle owner, parent, etc. can be notified if a GPS-enabled vehicle crosses a defined geo-fence.

SUMMARY

In a first illustrative embodiment, a system includes a transceiver and a processor in communication with the transceiver and configured to send an alert message when a wirelessly received vehicle identification received by the transceiver from a proximate vehicle matches an identification previously provided to the transceiver for tracking.

In a second illustrative embodiment, a system includes a processor configured to receive a boundary defining a geo-fence and a vehicle identifier. The processor is also configured to associate a plurality of existing dedicated short range communication (DSRC) transceivers with the boundary and send the vehicle identifier to each of the associated DSRC transceivers.

In a third illustrative embodiment, a system includes a processor configured to instruct reporting of detection of communication between a vehicle and one of a plurality of dedicated short range communication (DSRC) transceivers, the plurality of DSRC transceivers corresponding to a defined geo-fence.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
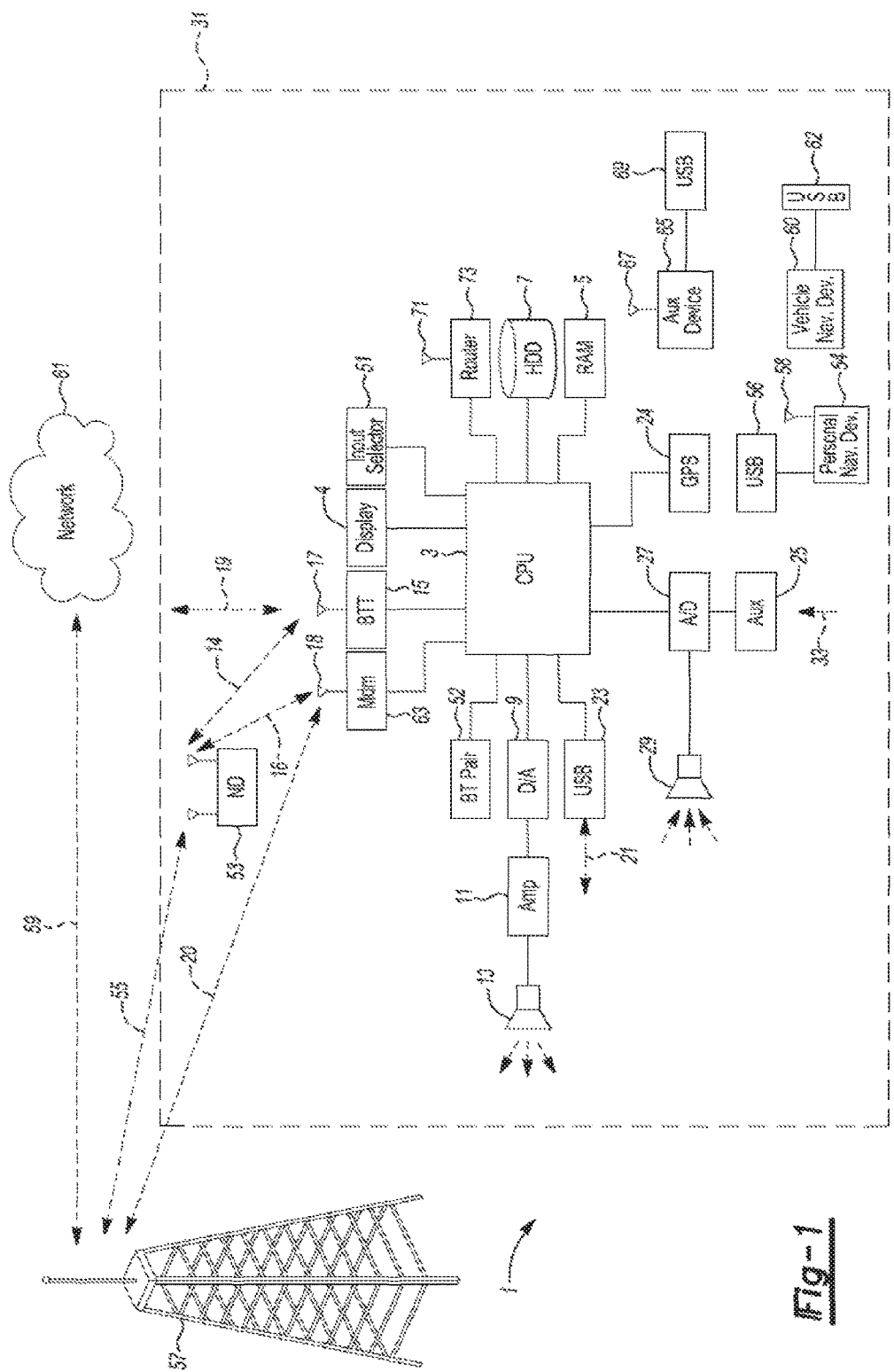
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

There is a stated intent by the United States government to deploy a network of dedicated short range communication (DSRC) devices. These devices will be installed at fixed locations, and will enable wireless communication with passing vehicles on a dedicated bandwidth. These devices are expected to eventually be deployed in a fairly dense array, especially around major travel routes and around cities.

Typical DSRC range is only a few hundred meters, which would again indicate a likely dense deployment if an intent is to blanket road networks, especially to facilitate autonomous vehicle communication. Together, these DSRC devices will form a wide area network (WAN), with each device having a known, fixed location. These devices are also, under the illustrative embodiments, considered to be equipped with capability to detect a vehicle's vehicle identification number (VIN), allowing an individual device to uniquely identify a passing vehicle. If the devices are capable of remote or relay (to a hub, for example) communication, the devices can then identify a passing vehicle to a cloud-based system, where the identification information can be used in at least the manner proposed.

Conversely, or additionally, any point can identify itself to a vehicle as the vehicle passes the point, and a vehicle communications unit, such as a telematics control unit (TCU) can be used to relay vehicle location (based on a passed, identified point) to a remote system for processing. In still a further example, the vehicle can download a list of, for example, DSRC units comprising a geo-fence (such as unique network identifiers, names, numbers, etc. for each unit comprising the fence) and take action if any of the units is detected. This version of the solution avoids having the actual vehicle location leave the vehicle.

Figure 2:
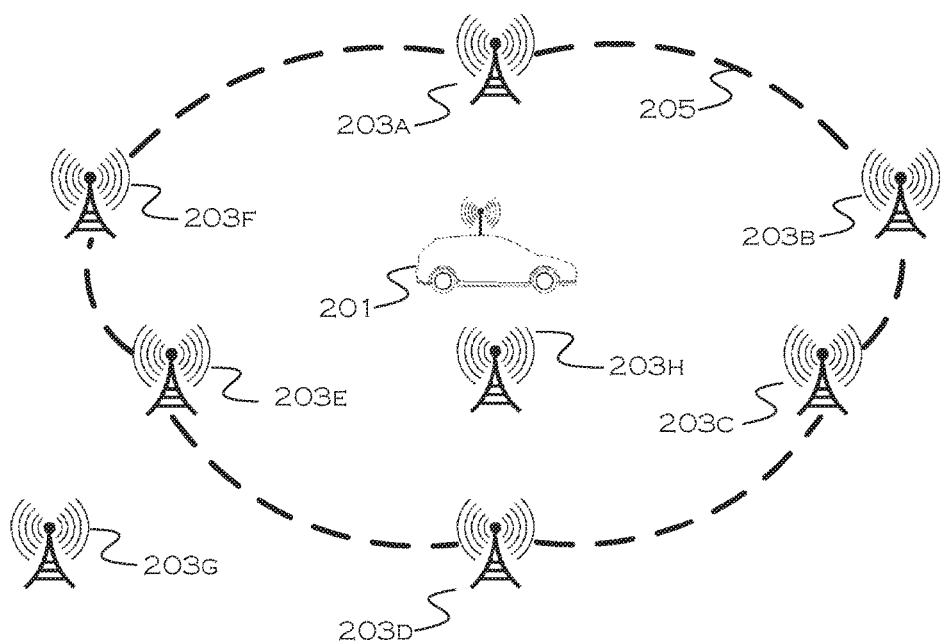
FIG. 2 shows an illustrative example of a DSRC device network.

FIG. 2 shows an illustrative example of a DSRC device network. In this illustrative example, a geo-fence 205 is defined between a series of DSRC towers. In another version of the example, the geo-fence is given geographic parameters, and towers closely matching the border coordinates are utilized to define the fence. This can be over-cautionary (using towers inside the border), under-cautionary (using towers outside the border, but which may be nearer to the border than any tower inside the border) or employ a mix of towers inside and outside the geographic borders. Users can define the fence geographically or using actual selection of towers through a visual interface.

For example, if a parent absolutely did not want a teenage driver to leave town limits, the parent may set the borders at the town limits, and then a geo-fence that included all towers inside this set of boundaries could be used. This fence may be more limiting than an actual geographic fence set at exactly the town limits, but it ensures that the parent will be notified if the driver approaches the town limits. If there is a significant gap between DSRC units, the parent could also set a plurality of fence boundaries, one to serve as a warning, inside the limits, if the vehicle were approaching the limits, and another to issue an alert if the vehicle passed a DSRC device outside the town limits (defining an outer "do not cross" boundary).

On the other hand, an automotive dealer may want to restrict a test-drive to roughly a five mile radius from the dealership. Not caring if any particular boundary was crossed, the dealer could define a five mile radius and simply utilize devices outside this boundary (but proximate) or inside and outside, depending on which device was closest to the boundary. This gives test drivers a little more flexibility, and more-or-less notifies the dealer and/or driver if the five mile boundary was breached (for example, a few devices might be 5.2 miles away from the dealership, others may be 4.8 miles from the dealership, and both could be used to roughly define the desired boundary). Once sufficient infrastructure exists, it will be possible to more precisely define a set of limits bounded by the devices.

In the example shown in FIG. 2, the devices 203A, 203B, 203C, 203D, 203E and 203 F serve as the boundary devices for the geo-fence. These devices may represent all devices located on roads heading across the boundary 205 from a vehicle's present location 201. If the user went "off-road," for example, the vehicle might not pass in proximity to any known device, and notification could be avoided. On the other hand, recognition of a later device, such as 203G, known to be outside the border (or at least, identifiable in retrospect as lying outside the border upon the vehicle encountering the device) could serve as a backup to let any interested entity know that the vehicle (or person carrying a GPS device) was now outside the defined border. With sufficient device-density, it will be difficult to bypass even the initial fence without resorting to off-road travel, and further this back-up identification notion will be more precise, unless the user continues to avoid paved roads or locations where devices are deployed.

Device 203H is inside the boundary and in this example is not included in the geo-fence. If it is proximate to the boundary, however, but was not selected because it is a threshold distance away from the fence, it could be used as an initial warning device that the fence was being approached.

Figure 3:
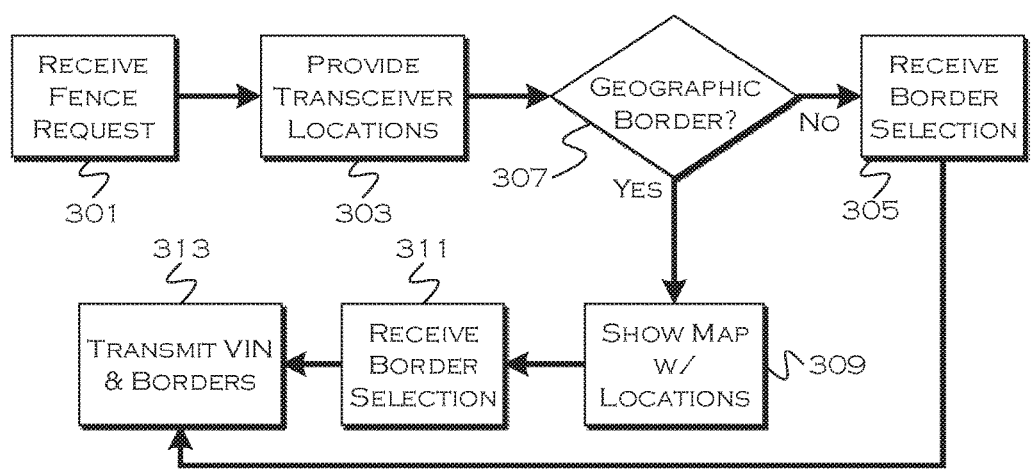
FIG. 3 shows an illustrative example of a geo-fence origination process.

FIG. 3 shows an illustrative example of a geo-fence origination process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process receives a request to create a geo-fence 301. For example, a user could log into a website, smart phone application, vehicle human machine interface (HMI), etc. to define a fence. In this example, the user creating the fence is provided with a list of transceiver locations 303, or at least the locations are provided to the software enabling the fence selection. Since there could be literally thousands of such devices deployed, it may be more reasonable for the user to first define a point of origin and some other constraints before receiving the device list, although once sufficient devices are deployed defining a geo-graphic border should typically suffice (since the border can be fairly precisely replicated with sufficient device deployment).

If the user wishes to define a geo-graphic border 307, a map may be shown 309, which may or may not also include device locations for reference. Even if individual device selection is not desired, the process may show the locations of devices on the map so a user knows if a particular geo-graphic boundary (road, city or county line, or even a drawn-line) will be reasonably close to one or more devices. The user can then select the border 311 by selecting, for example, roads, geographic points, or even drawing a boundary with a stylus or a finger.

On the other hand, a user may wish to define the border using known device locations, and can be shown a map with selectable device locations 305. In still another example, although one that will be likely less utilized, a sophisticated user can simply select devices from a list of devices, if the user knows which devices will comprise an appropriate fence. This selection might be more usable if the devices included, for example, cross-roads where the devices were located, or other identifying features usable to determine the rough (or even precise) location of each device.

Once the appropriate selection has been made, a user ID (in this case, a VIN), can be sent for tracking, as well as the defined border 313.

In some embodiments, the user may simply define a geographic border and then the actual selection of DSRC devices can be done remotely, on a network server, for example. Also, since different types of tracking may be employed, different strategies can be utilized for determining which data is sent and to where.

For example, if the vehicle (or user phone) was to be tracked based on a DSRC device identifying the vehicle passing by, then it might make sense to have a server know both the tracked VIN and the fence boundaries. Then, if any device comprising the boundaries reported "seeing" the VIN, the server would know the vehicle had neared or passed the device, and could perform the appropriate notification and/or any other actions.

On the other hand, if the vehicle was going to self-report DSRC devices "seen" by the vehicle (by "seen," it is understood that, for example, the "seeing" entity wirelessly identifies a device in wireless communication with the entity), then an automotive OEM server may associate a series of border-defining DSRC devices with each tracked VIN, and perform the appropriate action if a particular vehicle identifies a device associated with a border for that vehicle.

In still another example, if the tracking was done on-board the vehicle, the VIN might be used to establish a network connection (using a network address associated with the VIN) with a particular vehicle, and the list of DSRC devices could be downloaded to the vehicle. Then, if a vehicle "sees" a device on the downloaded list, the vehicle could alert a driver or any remote entity. This particular example provides increased privacy and functions even in the absence of a remote connection (once the vehicle has received the initial list, that is), and may also be useful if the DSRC devices are unable to report or prohibited from reporting vehicle identifications.

Figure 4:
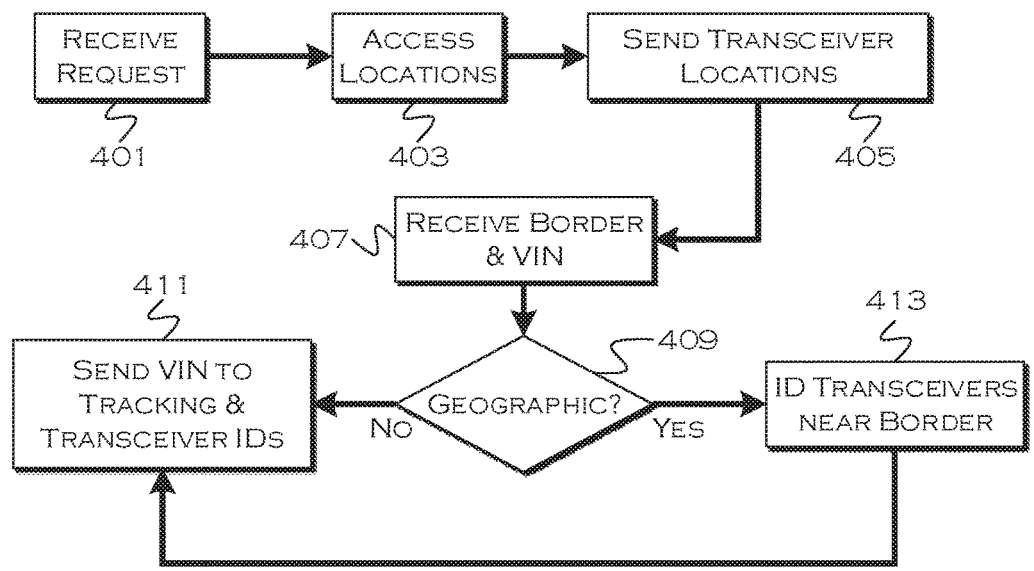
FIG. 4 shows an illustrative process for defining a geo-fence.

FIG. 4 shows an illustrative process for defining a geo-fence. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process receives a request to define a geo-fence 401. This could be submitted, for example, by a parent, fleet manager, dealer, or other entity interested in tracking or constraining a vehicle through a geo-fence. In this example, the process is communicating with a creation-side process (such as that in FIG. 3), and accesses a list of DSRC device locations and identifiers 303 and provides the list to the requesting device or process 405. As previously noted, the saturation of these devices may be such that a great number of devices are deployed in a small area, so the initial request may include some set of limiting parameters (initial location, radius from location, boundaries, etc) to restrict the number of DSRC device identifiers/locations sent in response.

Once the user has defined a border, the process receives the border (in this example a DSRC specific border or a geographic border, selected by the remote user) 407. If the border is geographic 409, a set of DSRC devices may not yet be assigned as a proxy for the geographic border. In such a case, the process will identify DSRC devices near the border (subject to appropriate constraints as previously discussed) 413 and define the border using DSRC devices known to be near the border, as appropriate. If the border is defined initially using DSRC devices, or once the border has been defined using DSRC devices, in this example, the process submits the VIN to the appropriately identified devices.

In order to minimize network traffic, i.e., so that every DSRC device doesn't report every vehicle passing each device, the DSRC devices themselves are assigned a list of vehicles to "look for." Thus, if a device has fifty VIN numbers assigned thereto, and a vehicle of appropriate VIN passes the device, then the device can report the existence of the vehicle. As previously discussed, there are a multitude of other ways to track vehicle+device correspondences, such as reporting all vehicles to a hub responsible for tracking, reporting "seen" DSRC devices to an automotive OEM for tracking, vehicle self-tracking, and any other reasonable paradigm that allows DSRC devices to be used to define a geo-fence.

Figure 5:
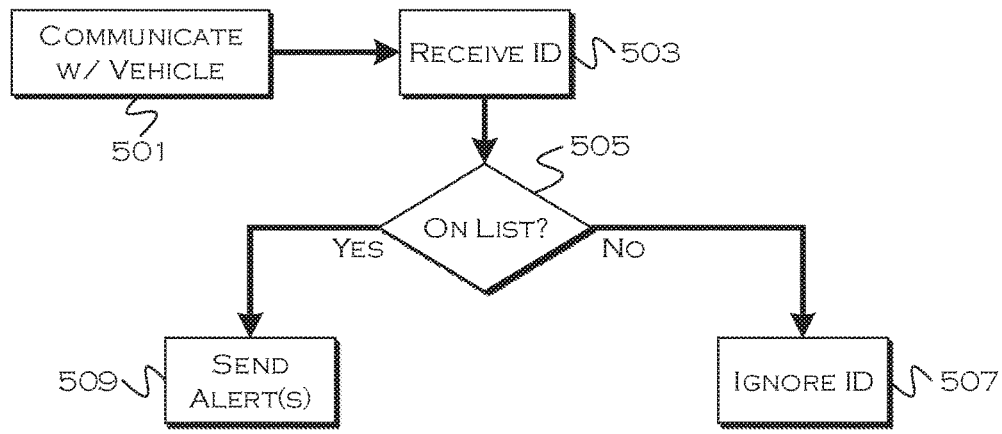
FIG. 5 shows an illustrative process for tracking a vehicle.

FIG. 5 shows an illustrative process for tracking a vehicle. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process, running on a DSRC device, communicates with the vehicle 501. This communication will be wireless communication, established as the vehicle reaches a communicable proximity to the device. The DSRC device receives a VIN (or other unique identifier) from the vehicle 503.

In this example, as noted with respect to FIG. 4, the individual DSRC devices are provided with a list of VINs for which to look, and so the process checks to see if a received VIN is on the list of tracked VINs for the particular device 505. If the VIN or other ID is on the list 505, the process will report having seen the vehicle, send an alert, or take other appropriate action 509. If the VIN or other ID is not on the list, then, in this example, the process disregards the received VIN 507 and continues to check other passing vehicles.

While illustrative embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that may not be explicitly described or illustrated.

What is claimed is:

1. A system comprising:
a processor configured to:

receive both a boundary defining a geo-fence and a vehicle identifier;
associate a plurality of existing dedicated short range communication (DSRC) transceivers with the boundary;
send the vehicle identifier to each of the associated DSRC transceivers; and
instruct each of the DSRC transceivers to report communication with a vehicle having the vehicle identifier.

2. The system of claim 1, wherein the boundary is received as a defined list of DSRC transceivers.

3. The system of claim 2, wherein the processor is configured to associate the plurality of existing DSRC transceivers based on the defined list of DSRC transceivers.

4. The system of claim 1, wherein the boundary is received as a geographic boundary.

5. The system of claim 4, wherein the processor is configured to associate the plurality of existing DSRC transceivers based on a location of each transceiver being within a threshold proximity to a point on the geographic boundary.

6. The system of claim 5, wherein the processor is configured to include DSRC transceivers outside the geographic boundary in the association.

7. The system of claim 5, wherein the processor is configured to only utilize DSRC transceivers inside the geographic boundary in the association.

8. The system of claim 5, wherein the processor is configured to select DSRC transceivers, inside or outside the boundary, based on which of an inside/outside transceiver pair at a boundary point is more proximate to the geographic boundary.

9. A system comprising:
a processor configured to:
instruct a vehicle to wirelessly report, to a remote server, detection of communication between the vehicle and one of a plurality of predesignated dedicated short range communication (DSRC) transceivers, the plurality of DSRC transceivers corresponding to a predefined geo-fence.

10. The system of claim 9, wherein the processor is configured to instruct reporting by sending a list of DSRC transceiver identifiers, corresponding to the plurality of DSRC transceivers, to the vehicle so that the vehicle can report detection of communication with a DSRC transceiver having one of the DSRC transceiver identifiers.

11. The system of claim 9, wherein the processor is further configured to instruct a DSRC transceiver to report to the remote server by sending a vehicle identifier to each of the plurality of DSRC transceivers so that the DSRC transceiver can report detection of communication with the vehicle having the vehicle identifier.

12. The system of claim 9, wherein the geo-fence is defined by geographic boundaries.

13. The system of claim 9, wherein the geo-fence is defined by the plurality of DSRC transceivers.

* * * * *